(12) United States Patent
Ohara

(10) Patent No.: US 8,813,906 B2
(45) Date of Patent: Aug. 26, 2014

(54) SPEAKER DAMPER AND MANUFACTURING METHOD OF THE SAME

(71) Applicant: Hiroshi Ohara, Taoyuan County (TW)

(72) Inventor: Hiroshi Ohara, Taoyuan County (TW)

(*) Notice: Subject to any disclaimer, the term of this patent is extended or adjusted under 35 U.S.C. 154(b) by 78 days.

(21) Appl. No.: 13/652,642

(22) Filed: Oct. 16, 2012

(65) Prior Publication Data

US 2014/0102825 A1 Apr. 17, 2014

(51) Int. Cl.
| *G10K 13/00* | (2006.01) |
| *H04R 1/00* | (2006.01) |
| *H04R 7/00* | (2006.01) |
| *H04R 9/06* | (2006.01) |
| *H04R 11/02* | (2006.01) |
| *D02G 3/00* | (2006.01) |
| *H04R 7/20* | (2006.01) |
| *H04R 7/12* | (2006.01) |
| *H04R 9/04* | (2006.01) |
| *H04R 7/26* | (2006.01) |

(52) U.S. Cl.
CPC ........ *H04R 7/20* (2013.01); *G10K 13/00* (2013.01); *H04R 9/06* (2013.01); *H04R 7/12* (2013.01); *H04R 9/043* (2013.01); *H04R 7/26* (2013.01); *H04R 9/041* (2013.01)
USPC ........... 181/171; 181/166; 181/169; 264/145; 381/403; 381/409; 428/373

(58) Field of Classification Search
CPC .............. H04R 7/20; H04R 7/12; H04R 7/26; H04R 9/06; H04R 9/041
USPC ....... 181/171, 166, 169; 139/383 A; 381/403, 381/409
See application file for complete search history.

(56) References Cited

U.S. PATENT DOCUMENTS

| 4,159,618 | A | * | 7/1979 | Sokaris ........................... 57/251 |
| 4,259,394 | A | * | 3/1981 | Khan .............................. 442/191 |
| 4,632,716 | A | * | 12/1986 | Smith ............................ 156/148 |
| 4,731,281 | A | * | 3/1988 | Fleischer et al. .............. 428/196 |
| 5,776,597 | A | * | 7/1998 | Watanabe et al. ........... 428/297.4 |
| 5,878,150 | A | * | 3/1999 | Okazaki et al. ................ 381/428 |
| 5,966,797 | A | * | 10/1999 | Okazaki et al. ............... 29/527.2 |
| 2003/0123693 | A1 | * | 7/2003 | Ohara ........................... 381/409 |
| 2003/0221740 | A1 | * | 12/2003 | Ohara ........................ 139/420 A |
| 2006/0093817 | A1 | * | 5/2006 | Ishigaki et al. ................ 428/364 |
| 2007/0283677 | A1 | * | 12/2007 | Ohara .............................. 57/210 |
| 2007/0287344 | A1 | * | 12/2007 | Ohara ................................ 442/2 |
| 2008/0000740 | A1 | * | 1/2008 | Ohara ........................... 188/377 |
| 2009/0010471 | A1 | * | 1/2009 | Okazaki et al. ................ 381/354 |
| 2009/0017302 | A1 | * | 1/2009 | Ohara ........................... 428/373 |

* cited by examiner

*Primary Examiner* — David Warren
*Assistant Examiner* — Christina Russell
(74) *Attorney, Agent, or Firm* — Lin & Associates IP, Inc.

(57) ABSTRACT

A damper speaker includes a fiber cloth woven by fibers, each of the fibers is formed by a single fiber strand or several fiber strands. The fiber strand includes a first fiber, which is one or a combination of cotton, polyester and aramid fiber. When the first fiber is the combination of cotton, polyester and aramid fiber, the weight ratio of any one to the fiber cloth is 0~100%, and the weight ratio of the other two is adjusted. When the weight ratio of the first fiber to the fiber cloth is less than 100%, the fiber cloth includes a second fiber, which is one or a combination of rayon, silk, flax, acrylic, rubber and synthetic fiber. The speaker damper includes a layer of resin, which is absorbed by and combined with the fiber cloth. The fiber cloth is then cut into a predetermined shape through a molding means.

4 Claims, 4 Drawing Sheets

SPEAKER DAMPER AND MANUFACTURING METHOD OF THE SAME

BACKGROUND OF THE INVENTION

1. Field of the Invention

The present invention relates to a vibrating structure of speakers, more particularly, to a speaker damper and the manufacturing method thereof.

2. The Prior Arts

The damper is one of the most important components in a speaker. A damper with good flexibility and stiffness can not only provide a better output efficiency and acoustic feature for the speaker, but also serves as the foundation of quality management for the speaker manufacturers and prolongs the life span of the speakers.

Conventional dampers usually utilize cotton cloth as its basic material, where the cotton cloth is soaked in a liquid synthetic resin for the fibers to absorb the resins. The vertical and horizontal fibers of the cotton cloth filled with resin are fixed and adhered in a fixed position after the cloth is dried and hardened, in the mean time, the synthetic resin covers the surface of the cotton cloth to form synthetic resin films on the both sides of the cotton cloth. The cotton cloth with synthetic resin films is then heated, pressurized and cut with a damper mold to form an annularly corrugated damper.

Although the cotton cloth fibers have the advantage of a great ability in absorbing the synthetic resins, it also has the following drawbacks: (1) The damper made from cotton cloth has a weaker resistance to lateral forces, which leads to fatigue and easy rupture of the damper, thus damaging the acoustic outcome of the speaker and shortening the life span of the damper. (2) The dampers or cone edges made from cotton cloth lack flexibility, have a weaker resonance with the sounds wave and also generate generates poorer quality of sounds. (3) The dampers made from cotton cloth have a lower stiffness, which leads to a weaker ability in enduring the sound wave of high power output, thus cannot be applied to a high power output speaker.

Hence, in order to improve the lateral force resistance, flexibility and stiffness of the cotton cloth, the improved damper is added fine steel wires in the vertical and horizontal directions during the weaving of the cotton cloth to avoid the abovementioned drawbacks. However, while the new improved cotton cloth does improve the drawbacks mentioned earlier, it also generates other disadvantages as following: (1) The fine steel wires utilized in cotton cloth weaving can do dramatic damages to the cropping mold of damper. The purpose of the mold is to crop the cotton cloth to form the damper, however, after cutting the cotton cloth repeatedly, the fine steel wires will damage the mold and create infinite small dents on the edges of the mold. After a certain time period, the mold will become unusable and a new replacement of the mold will be required. Thus, the cotton cloth with fine steel wires can cause the production process to be interrupted, which lowers the manufacturing efficiency, also increases the expenses on mold, which increases the production costs as well. (2) The flexibility and stiffness of the thin steel wires are far higher than the cotton fibers. Such condition can cause the force to be uneven on the cotton cloth, which leads to interruption of sonic resonance. (3) The thin steel wires in the inner or outer perimeter of the cropped damper needs to be cut or bent to avoid direct contact with other metals. This extra step is necessary to prevent the occurrence of short circuit which can damage the speaker.

Due to the above reasons, the purpose of the present invention is to provide a damper and a manufacturing method thereof to improve the lateral strength, flexibility and stiffness of the damper, and also to prolong the life span of the damper, improve the flexibility of resonance and the quality of sounds and thereby producing a damper that can endure the sound wave pressure of high power output speakers.

SUMMARY OF THE INVENTION

A primary purpose of the present invention is to provide a speaker damper including a fiber cloth, the fiber cloth is woven by a plurality of fibers, wherein each of the fibers is formed by a single fiber strand or a plurality of fiber strands formed through multiple yarns twists. The fiber strand at least includes a first fiber, which is one of or a combination of cotton, polyester and aramid fiber. When the first fiber is the combination of all three of cotton, polyester and aramid fiber, the weight ratio of any one of the three material to the fiber cloth is 0~100%, and the weight ratio of the other two materials is adjusted accordingly. When the weight ratio of the first fiber to the fiber cloth is less than 100%, the fiber cloth further includes a second fiber which is one of or a combination of rayon, silk, flax, acrylic, rubber and synthetic fiber. The damper speaker also includes a layer of resin, which is absorbed by and combined with the fiber cloth, and the fiber cloth is then formed into a predetermined shape through a molding means.

More preferably, the formation temperature of the cotton is at 245° C. plus and minus 30° C., the formation temperature of the polyester is at 200° C. plus and minus 30° C. and the formation temperature of the aramid fiber is at 240° C. plus and minus 35° C.

More preferably, the layer of resin is one of or a combination of phenolic resin, epoxy resin and polyester resin.

Another purpose of the present invention is to provide a manufacturing method of a speaker damper including the following steps:

(i) providing a plurality of fibers, wherein each of the fibers is formed by a single fiber stand or a plurality of fiber strands formed through multiple yarns twists. The fiber strand at least includes a first fiber, which is one of or a combination of cotton, polyester and aramid fiber. When the first fiber is the combination of all three of cotton, polyester and aramid fiber, the weight ratio of any one of the three material to the fiber cloth is 0~100%, and the weight ratio of the other two materials is adjusted accordingly. When the weight ratio of the first fiber to the fiber cloth is less than 100%, the fiber cloth further includes a second fiber which is one of or a combination of rayon, silk, flax, acrylic, rubber, armid fiber and bamboo fiber;

(ii) weaving the plurality of fibers into a fiber cloth with a predetermined weight ratio;

(iii) soaking the fiber cloth in a resin so that the resin is absorbed by the fiber cloth;

(iv) heating the fiber cloth so that the resin forms a layer of resin on the fiber cloth; and (v) forming the fiber cloth with hot press molding process.

More preferably, the fiber cloth is cropped into proper sizes after forming the fiber cloth with hot press molding process.

More preferably, the formation temperature of the cotton is at 245° C. plus and minus 30° C., the formation temperature of the polyester is at 200° C. plus and minus 30° C. and the formation temperature of the cotton is at 240° C. plus and minus 35° C.

With the features and the method of the present invention, the lateral strength, flexibility and stiffness of the damper can be uniformly increased, the life span can be prolonged and the flexibility of resonance and quality of sound can be raised. The damper is also made endurable of the sound wave pressure of the high power output speaker. With materials of various flexibility and stiffness, the speaker damper can be adjusted to apply to speakers with different levels of output power and acoustic features. When the stiffness of the material is increased, the damper can amplify the output power of the speaker and also improve the acoustic feature. In addition, during the cropping of the damper, the damper mold will not be damaged since there are no thin steel wires (metal wires) involved, thereby saving the production time, increasing the production efficiency and lowering the production cost.

DETAILED DESCRIPTION OF THE PREFERRED EMBODIMENT

The present invention will be apparent to those skilled in the art by reading the following detailed description of preferred embodiments thereof, with reference to the attached drawings.

Speaker Damper

Figure 1:
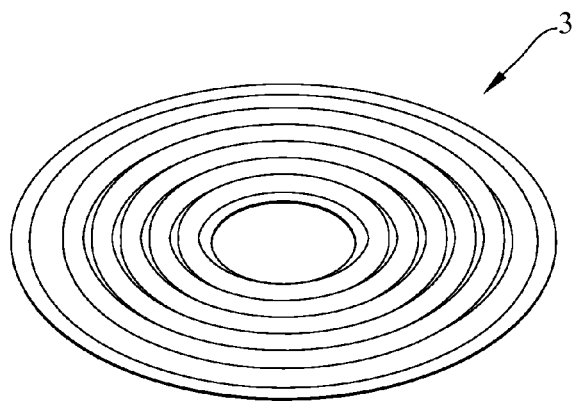
FIG. 1 is a perspective view showing the speaker damper of the present invention.
Figure 2:
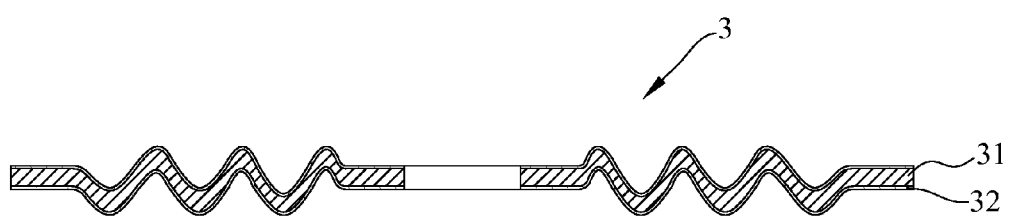
FIG. 2 is a cross-sectional view showing the speaker damper of the present invention.
Figure 3:
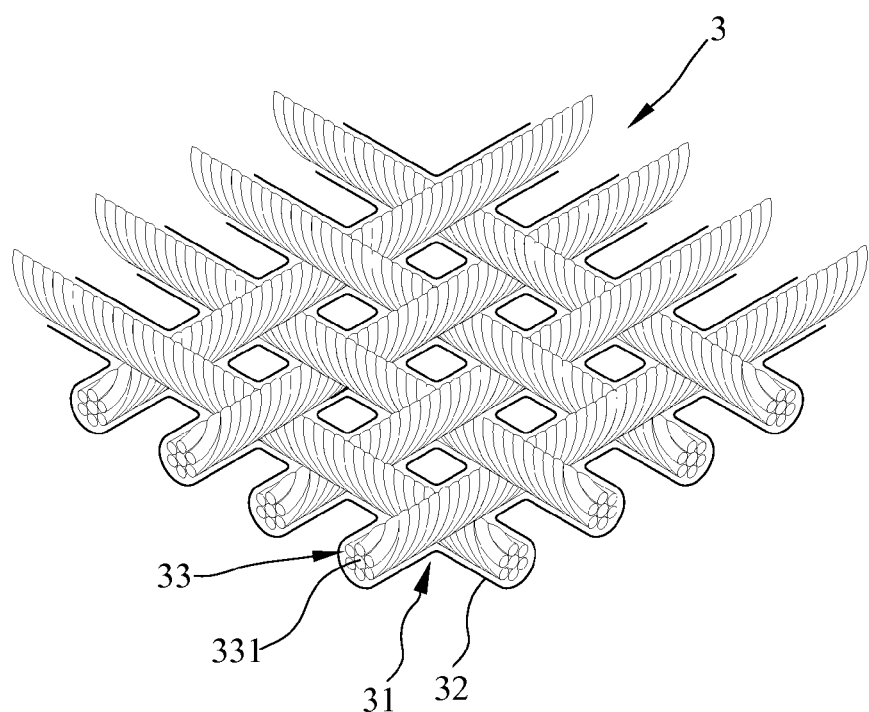
FIG. 3 is a detailed view showing a part of the speaker damper of the present invention.

FIG. 1~FIG. 3 shows the perspective view, cross-sectional view and the detailed view of the speaker damper 3 of the present invention respectively. The speaker damper 3 mainly includes a fiber cloth 31 and a layer of resin 32. The fiber cloth 31 is woven by a plurality of fibers 33, where each of the fibers 33 is formed by a single fiber strand or a plurality of fiber strands 331 formed through multiple yarns twists (FIG. 3 shows the multiple yarn twists). The fiber strand 331 at least includes a first fiber which is one of or a combination of cotton, polyester and aramid fiber. When the first fiber is the combination of all three of cotton, polyester and aramid fiber, the weight ratio of any one of the three material to the fiber cloth is 0~100%, and the weight ratios of the other two materials are adjusted accordingly. When the weight ratio of the first fiber to the fiber cloth is less than 100%, the fiber cloth further includes a second fiber which is one of or a combination of rayon, silk, flax, acrylic, rubber and synthetic fiber. The damper speaker 3 also includes a layer of resin 32 which is absorbed by and combined with the fiber cloth 31, and the fiber cloth 31 is then formed into a predetermined shape through a molding means. The formation temperature of the cotton is at 245° C. plus and minus 30° C., the formation temperature of the polyester is at 200° C. plus and minus 20° C. and the formation temperature of the cotton is at 235° C. plus and minus 10° C. The layer of resin 32 is one of or a combination of phenolic resin, epoxy resin and polyester resin.

Manufacturing Method of the Speaker Damper

Figure 4:
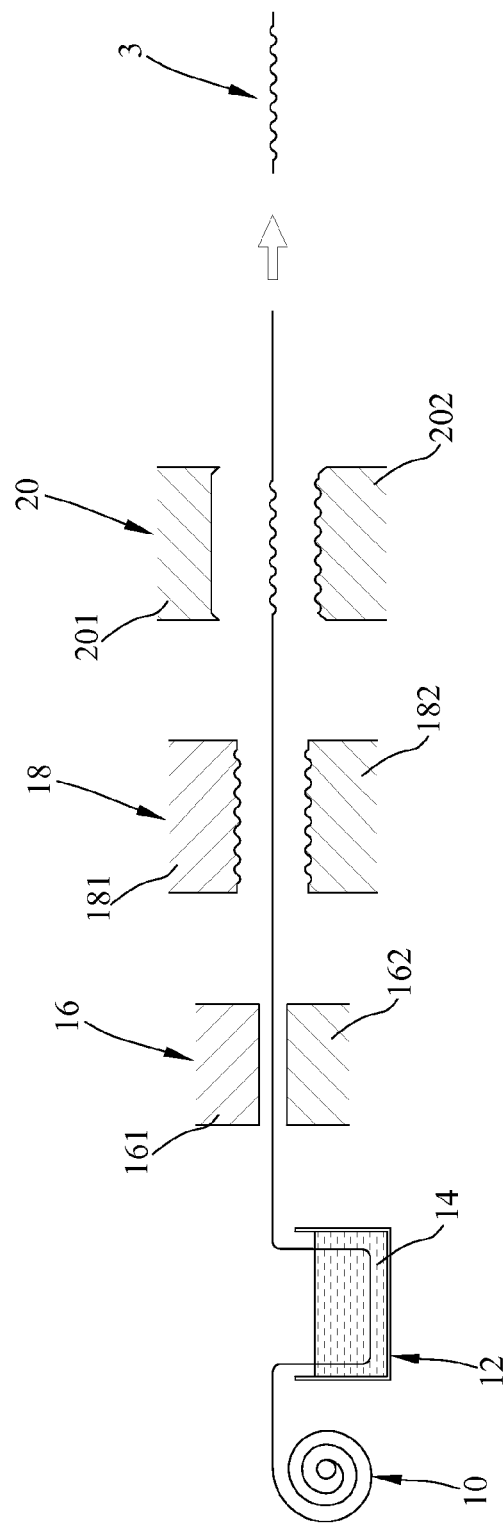
FIG. 4 is a flow graph of the manufacturing method of the speaker damper of the present invention.

FIG. 4 shows the flow graph of the manufacturing method of the speaker damper of the present invention. As shown in the graph, the following units are needed during the manufacturing steps: a fiber cloth 10, a resin tank 12, a heating device 16, a forming mold 18 and a cutting device 20.

In the manufacturing process of the speaker damper 3, a fiber cloth 10 is needed first. The fiber cloth 10 is woven by a plurality of fibers (warp and weft) with a predetermined weight ratio, wherein each of the fibers can be formed by a single fiber strand or a plurality of fiber strands formed through multiple yarns twists. The fiber strand at least includes a first fiber, which is one of or a combination of cotton, polyester and aramid fiber. When the first fiber is the combination of all three of cotton, polyester and aramid fiber, the weight ratio of any one of the three material to the fiber cloth is 0~100%, and the weight ratios of the other two materials are adjusted accordingly. When the weight ratio of the first fiber to the fiber cloth is less than 100%, the fiber cloth further includes a second fiber which is one of or a combination of rayon, silk, flax, acrylic, rubber, armid fiber and bamboo fiber.

During the soaking step, a resin tank 12 is provided with liquid resin 14 within. The resin 14 can be phenolic resin, epoxy resin, polyester resin and etc. The liquid resin 14 contains 50% or more solid matter such as alcohol and water. The fiber cloth 10 is soaked in the resin 14 of the resin tank 12, so that the resin 14 is absorbed by the fibers (warp and weft).

During the heating step, a heating device 16 is provided. The heating device 16 is assembled with an upper and a lower heating plate 161 and 162, where the two heating plates 161 and 162 disposes a space in between that is slightly larger than the width of the fiber cloth 10. The two heating plates 161 and 162 are maintained at a specific temperature. The fiber cloth 10 is then placed into the heating device 16 after being removed from the resin tank 12, and the fiber cloth is placed right between the upper and lower heating plates 161 and 162. With the temperature of the heating plates 161 and 162, the volatile substance and water in the fiber cloth 10 can be removed and the fiber cloth 10 can be dried. In the mean time, resin 14 can permeate into the fiber cloth 10 and adhere to the warp and weft of the fiber cloth 10. Because the liquid resin 14 in the resin tank 12 contains 50% or more solid matter, the fiber cloth 10 soaked in the resin tank 12 is adhered with a lot of resin 14, which forms into many group structures on the fiber cloth 10.

During the molding step, the upper and lower mold 181 and 182 serve the top surface and bottom surface of the speaker damper 3 respectively. The mold 18 serves to shape the speaker damper 3 and usually into a wavy shape, where the number of waves can be adjusted accordingly. Normally, the number of waves is between 3~5, and the inner perimeter, outer perimeter and the location of adjacent waves are not symmetrical. When the forming mold 18 clamps, a forming space is formed between the upper and lower mold 181 and 182. The size of the forming space is smaller or equal to the width of the fiber cloth 10 after it was soaked in the liquid resin 14. When the heating step is finished, fiber cloth 10 is then placed between the upper and lower mold 181 and 182, so that the fiber cloth 10 is clamped between the two molds 181 and 182. The upper mold 181 and lower mold 182 also dispose heating devices for heating the fiber cloth 10 simultaneously while the fiber cloth 10 is compressed by the upper and lower mold 181 and 182. The heating temperature is between 190~270° C., so that the resin 14 in the fiber cloth is softened due to the heat. In addition to softening the resin 14, the heating also helps the resin 14 between the warp and weft to fill up the forming space to form a layer of resin, and also to cover each of the warp and weft.

During the cutting step, a cutting device 20 is provided with an upper cutting tool 201 and a lower cutting tool 202. The main purposes of the cutting device 20 are to cut the extra parts of the fiber cloth 10, and also to separate the formed fiber cloth 10 from the original fiber cloth. When removing the formed fiber cloth 10 from the forming mold 18, the formed fiber cloth 10 is still connected with the original fiber cloth; therefore, the cutting device 20 is used to cut the connecting parts and the extra parts to finish the manufacturing of the speaker damper 3.

Composition of the Speaker Damper

The main fiber (the first fiber described previously) which composes the speaker damper of the present invention includes cotton, polyester and aramid fiber. In the preferred embodiment, the weight ratio of the first fiber to the entire fiber cloth can be 100% or 99.9~95% (including secondary fibers).

The cotton fiber has a high absorption factor, thus it can absorb the synthetic resin effectively, adhere with the synthetic resin strongly and also absorb water very well. However, the elastic recovery, anti-fatigue toughness and heat resistance of the cotton fiber are also weaker. The formation temperature of the cotton is approximately 245° C. plus and minus 30° C.

The polyester has a medium absorption factor, thus it absorbs and adheres with the synthetic resin moderately and absorbs water poorly. On the other hand, the elastic recovery and anti-fatigue toughness of polyester is very high, but the heat resistance is still on the low end. The formation temperature of the polyester is approximately 200° C. plus and minus 30° C.

The aramid fiber has a low absorption factor, thus it absorbs and adheres with the synthetic resin poorly. However, it absorbs the water very well, and also has a very high elastic recovery, anti-fatigue toughness and heat resistance. The formation temperature of the aramid fiber is approximately 240° C. plus and minus 35° C.

In addition to the primary fiber, fiber cloth can also include/exclude other secondary fibers (second fiber as described previously). The secondary fiber can be one of or a combination of rayon, silk, flax, acrylic, rubber and synthetic fiber. When secondary fiber is included, the preferred weight ratio of secondary fiber to fiber cloth is between 0.1%-5.0%.

In the preferred embodiment, when the fiber cloth only includes one of or a combination of cotton, polyester and aramid fiber, the preferred weight ratio can be the followings:

(1) 80~20% for cotton, 20~80% for polyester and 0% for aramid fiber.

(2) 80~20% for cotton, 0% for polyester and 80~20% for aramid fiber.

(3) 0% for cotton, 100% for polyester and 0% for aramid fiber.

(4) 0% for cotton, 0% for polyester and 100% for aramid fiber.

(5) 37.5% for cotton, 37.5% for polyester and 25% for aramid fiber.

(6) 42.5% for cotton, 32.5% for polyester and 25% for aramid fiber.

(7) 50% for cotton, 25% for polyester and 25% for aramid fiber.

(8) 0% for cotton, 50% for polyester and 50% for aramid fiber.

(9) 12.5% for cotton, 37.5% for polyester and 50% for aramid fiber.

(10) 17.5% for cotton, 32.5% for polyester and 50% for aramid fiber.

The compositions of the first fiber listed above are the ones tested for the preferred embodiment for illustrative purpose but to limit the percentage of the composition of the three materials. That is, the weight ratio of any one of the cotton, polyester and aramid fiber can be 0~100% and the other two materials can be adjusted accordingly, so the sum of the three is equal to 100%. The characteristic of the speaker damper varies with different compositions of weight ratios.

Furthermore, when other secondary fibers are included, the fiber cloth can be span with acrylic and silk additionally. The weight ratio of "acrylic" and "cotton, polyester and aramid fiber" can be 0.1%-50%:99.9%-50%. The weight ratio of silk and "cotton, polyester and aramid fiber" can be 0.1%~25%:99.9%~70%.

The acrylic can be mixed with polyester in various ratios first, and then the mixture of the two can be mixed with cotton and aramid fiber according to the weight ratio described above, which is "cotton:polyester+acrylic:aramid fiber".

Each fiber of materials described above has its own formation temperature. The formation temperature of cotton is approximately 245° C. plus and minus 30° C., the formation temperature of polyester is approximately 200° C. plus and minus 30° C., the formation temperature of aramid fiber is approximately 240° C. plus and minus 35° C. and the formation temperature of fiber cloth is approximately 175° C.~250° C.

The speaker damper of the present invention can be applied to speakers with different levels of output powers and acoustic features. Each of the compositions described above has its own characteristics, therefore, by choosing the appropriate fiber materials, compositions and manufacturing method, the fiber cloth with suitable elasticity and stiffness can be woven.

Figure 5:
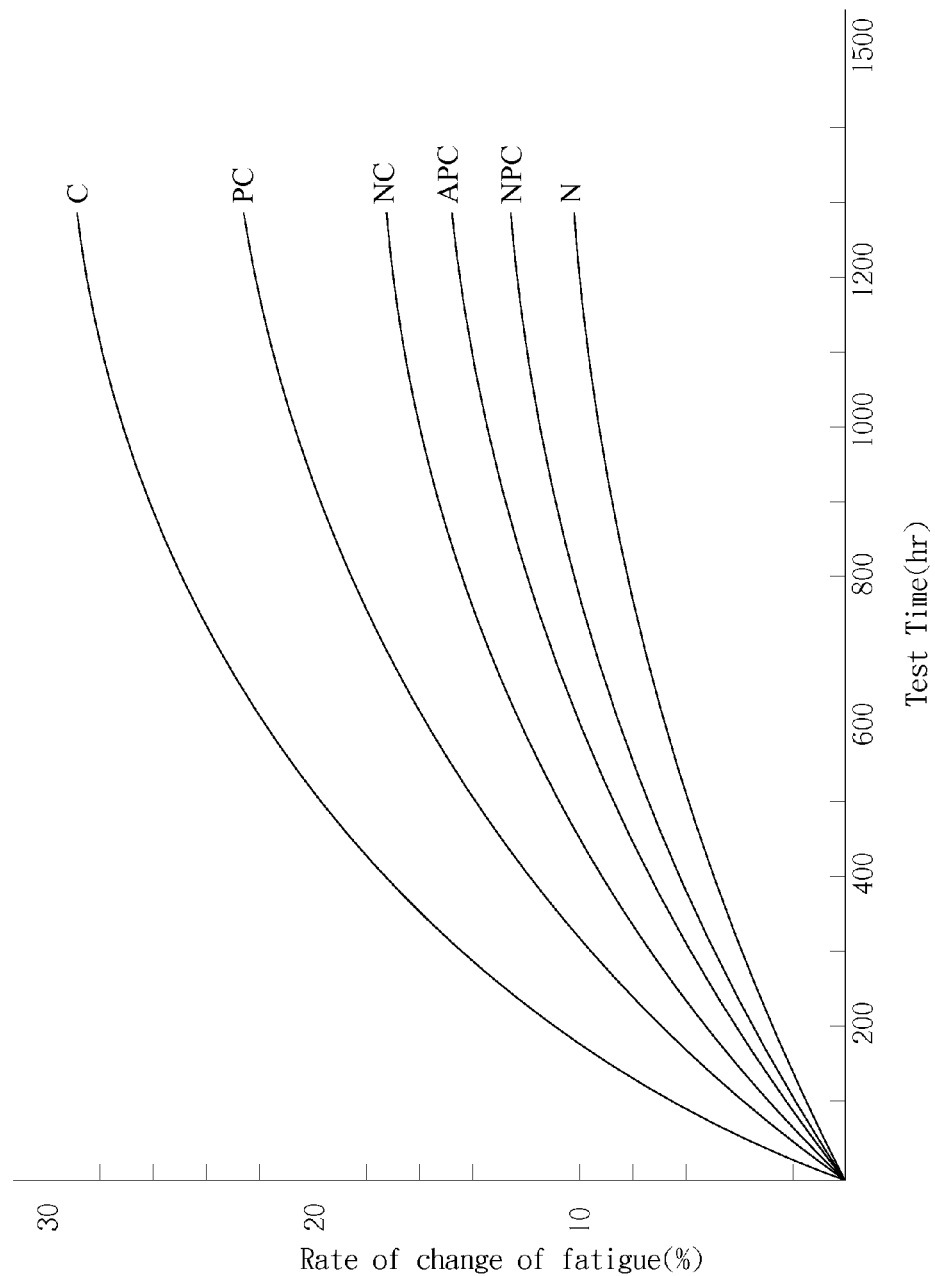
FIG. 5 is the fatigue test result of the speaker dampers with different compositions.

FIG. 5 is the fatigue test result of the speaker dampers with different compositions. As shown in FIG. 5, where N stands for aramid fiber, P stands for polyester, C stands for cotton and A stands for acrylics. The compositions of the six dampers in this figure are listed as following: C (100%), PC (P:C=50:50), NC (N:C=50:50), APC (A:P:C=25:25:50), NPC (N:P:C=25:25:50) and N (100%). By comparing the time (hr) to the rate of change of fatigue (%) of the fatigue test results, it is clear that C>PC>NC>APC>NPC>N. Therefore, speaker dampers made from N, NPC and APC have the least rate of change, best anti-fatigue strength and elastic recovery. Dampers composed of pure cotton are more likely to rupture due to fatigue when applied to speakers, which leads to broken noises. Nevertheless, the problem can be solved by mixing fibers such as A, P or N with cotton.

The speaker damper of the present invention has the characteristics of various elasticity and stiffness, therefore can be adjusted to meet the needs of speakers with different output powers and acoustic features. With the damper of the present invention, the sounds quality of the speaker is improved and the life span of the speaker is prolonged due to the higher stiffness of the damper. In addition, the damper manufacturer has more choices on the damper materials, so the speaker manufacturers can produce speakers with better output powers and acoustic features.

The preferred embodiment described above is disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:

1. A speaker damper comprising:
a fiber cloth formed by a plurality of fibers, wherein each of said plurality of fibers is formed by a single fiber strand or a plurality of fiber strands formed through multiple yarns twists, said fiber strand at least includes a first fiber material, wherein said first fiber material is one of or a combination of cotton, polyester and aramid fiber, wherein, when said first fiber material is a combination of cotton, polyester and aramid fiber, a weight ratio of any one of the three materials to said fiber cloth is 0~100%, and the weight ratios of the other two materials are adjusted accordingly; when the weight ratio of said first fiber material to said fiber cloth is less than 100%, said fiber cloth further includes a second fiber material, said second fiber material is one of or a combination of rayon, silk, flax, acrylic, rubber and synthetic fiber; and a layer of resin applied to said fiber cloth so as to be absorbed thereby, wherein said fiber cloth is then formed into a predetermined shape through a molding means;

wherein formation temperatures of said cotton, said polyester and said aramid fiber are 245° C.±30° C., 200° C.±30° C., and 240° C.±35° C. respectively.

2. The speaker damper as claimed in claim 1, the layer of resin is one of or a combination of phenolic resin, epoxy resin and polyester resin.

3. A method of manufacturing a speaker damper comprising:
 (i) providing a plurality of fibers;
 (ii) weaving said plurality of fibers into a fiber cloth with a predetermined weight ratio;
 (iii) soaking said fiber cloth in a resin so that said resin is absorbed by said fiber cloth;
 (iv) heating said fiber cloth so that said resin forms a layer of resin on said fiber cloth; and
 (v) forming said fiber cloth with a hot press molding process;

wherein each of said plurality of fibers is formed by a single fiber strand or a plurality of fiber strands formed through multiple yarns twists, said fiber strand at least includes a first fiber material, where said first fiber material is one of or a combination of cotton, polyester and aramid fiber, wherein, when said first fiber material is the combination of cotton, polyester and aramid fiber, a weight ratio of any one of the three materials to said fiber cloth is 0~100%, and the weight ratios of the other two materials are adjusted accordingly; when the weight ratio of said first fiber material to said fiber cloth is less than 100%, said fiber cloth further includes a second fiber material, said second fiber material is one of or a combination of rayon, silk, flax, acrylic, rubber, aramid fiber and bamboo fiber; and formation temperatures of said cotton, said polyester and said aramid fiber are 245° C.±30° C., 200° C.±30° C., and 240° C.±35° C. respectively.

4. The method as claimed in claim 3, wherein after forming said fiber cloth with said hot press molding process, said fiber cloth is then cropped into proper sizes.

* * * * *